United States Patent [19]

Leveque et al.

[11] Patent Number: 5,338,520
[45] Date of Patent: Aug. 16, 1994

[54] RECOVERY OF NEODYMIUM/DIDYMIUM VALUES FROM BASTNAESITE ORES

[75] Inventors: Alain Leveque; Jean-Luc Le Loarer, both of La Rochelle, France

[73] Assignee: Rhone-Poulenc Chimie, Courbevoie, France

[21] Appl. No.: 27,872

[22] Filed: Mar. 19, 1987

[30] Foreign Application Priority Data

Mar. 19, 1986 [FR] France ............................ 86 03889

[51] Int. Cl.$^5$ ............................................. C01F 17/00
[52] U.S. Cl. .................................. 423/21.1; 423/21.5; 423/263
[58] Field of Search ...................... 423/20, 21.1, 21.5, 423/263; 75/101 R, 121

[56] References Cited

U.S. PATENT DOCUMENTS

| | | | |
|---|---|---|---|
| 2,900,231 | 8/1959 | Kremers et al. | 423/21.1 |
| 3,812,233 | 5/1974 | Duncan | 423/21.1 |
| 4,514,367 | 4/1985 | Asami et al. | 423/21.5 |
| 4,528,130 | 7/1985 | Ledebrink et al. | 423/20 |
| 4,647,438 | 3/1987 | Sabot et al. | 423/21.5 |

FOREIGN PATENT DOCUMENTS

| | | |
|---|---|---|
| 0233810 | 3/1986 | Fed. Rep. of Germany . |
| 1503042 | 10/1967 | France . |
| 58-45341 | 3/1983 | Japan . |

OTHER PUBLICATIONS

Translation of Japanese patent 58-45341.
Chemical Abstracts, vol. 99, 1983, p. 188, No. 8891f.
Patent Abstracts of Japan, vol. 1, No. 91, 24 Aug. 1988, p. 1900.
Chemical Abstracts, vol. 78, 1973, p. 278, No. 152030h, "Rare earth elements. XXXIII. Extraction of rare earth elements . . . ".
Patents Abstracts of Japan, vol. 7, No. 155 (C-175) [1300], 7 Jul. 1983.
Patents Abstracts of Japan, vol. 1, No. 157, 14 Dec. 1988, p. 3414.
Soviet Inventions Illustrated, Section Chemical, No. 15990C/09 9 Apr. 1980.
Chemical Abstracts, vol. 79, 1973, p. 256, No. 3557y, "Distribution separation and salting out diagrams of aqueous . . . ".
Chemical Abstracts, vol. 101, 1984, p. 416, No. 7934d, "Study of heterogeneous equilibrium in the lanthanum (III) . . . ".

Primary Examiner—Michael Lewis
Assistant Examiner—Steven Bos
Attorney, Agent, or Firm—Burns, Doane, Swecker & Mathis

[57] ABSTRACT

Neodymium or didymium values are selectively recovered from bastnaesite ores, essentially to the exclusion of cerium and trace amounts of thorium, by (i) calcining the bastnaesite ore, (ii) selectively leaching the calcined bastnaesite with an aqueous solution of nitric acid to solubilize therein neodymium and trivalent rare earth values, and thereby producing an insoluble residue which comprises cerium and thorium values, (iii) separating the insoluble residue, and (iv) liquid/liquid extracting desired neodymium or didymium values from the nitric acid solution.

19 Claims, 1 Drawing Sheet

RECOVERY OF NEODYMIUM/DIDYMIUM VALUES FROM BASTNAESITE ORES

BACKGROUND OF THE INVENTION

1. Field of the Invention

The present invention relates to the separation of the rare earth values contained in minerals or concentrates rich in rare earth fluocarbonates and, in particular, bastnaesite. More especially, this invention relates to the improved separation of neodymium values from bastnaesite ores, possibly in combination with praseodymium and other rare earths contained therein.

By the term "rare earths" as utilized herein are intended the rare earth elements of the Periodic Table having atomic numbers of from 57 to 71, as well as yttrium which has an atomic number of 39.

In the description which follows, by the term "ceric rare earths" are intended the lightest rare earth elements by atomic numbers, beginning with lanthanum and extending to neodymium, and by the term "yttric rare earths" are intended the heaviest rare earths according to atomic numbers, beginning with samarium and extending to lutecium, and including yttrium. Also, by the term "trivalent rare earths" are intended the rare earth elements having the atomic numbers of 39, 57, 59 to 71.

The term "didymium" is a common designation for a mixture of neodymium and praseodymium, regardless of the proportions thereof.

Further, by the term "bastnaesite" is broadly intended a rare earth mineral comprising rare earth fluocarbonates, either with or without another component, in particular a mineral gangue, together with concentrates of these minerals.

2. Description of the Prior Art

The development of magnets based on the rare earths alloyed with iron, and more particularly those based on neodymium and praseodymium, mandate the availability of technically and economically efficient processes for the separation of such values.

Those processes currently used for the purification of rare earths from minerals are directed either at the recovery of all of the rare earths separated, which is difficult and expensive, or at a recovery of a fraction rich in the higher priced rare earths, in particular europium, the yttric rare earths and yttrium itself.

Numerous processes have been described and are used industrially to realize the aforementioned objectives, beginning with the conventional raw materials for the production of the rare earths, e.g., onazite, bastnaesite or xenotime.

Those processes heretofore proposed for the complete recovery of the rare earths typically employ decomposition with sodium hydroxide, followed by redissolution of the resulting hydroxides with hydrochloric or nitric acid. From solutions of the rare earth chlorides or nitrates, the rare earths values are separated from each other by successive liquid/liquid extractions.

In the case of bastnaesite, as described in Deco Trefoil, p.9, (November-December, 1967), a precalcination of the mineral may be employed, which makes it possible to solubilize only a part of the cerium with the mixture of the other rare earths during the subsequent recovery operation using hydrochloric acid. Beginning with the solution of the rare earth chlorides, a solvent separation of europium and the yttric fraction of rare earths is carried out.

As heretofore mentioned, although these processes enable the recovery of neodymium and praseodymium, they are not capable of effecting such purpose under satisfactory conditions relative to each intended application.

SUMMARY OF THE INVENTION

Accordingly, a major object of the present invention is the provision of an effective and economical process for the separation of the neodymium or didymium values contained in bastnaesite ore.

Briefly, the present invention features a process for the separation of neodymium or didymium from the rare earths contained in bastnaesite, comprising:

(i) first calcining the bastnaesite;

(ii) controlledly leaching the calcined bastnaesite using a nitric acid solution, thus solubilizing the neodymium and trivalent rare earths to the exclusion of the cerium values and trace amounts of thorium, which latter are present in the form of an insoluble residue which is then separated;

(iii) separating and purifying the neodymium or didymium values by liquid/liquid extraction between the aqueous phase which comprises the aqueous solution of the rare earth nitrates produced in the preceding step (ii), and an organic phase containing a water-insoluble extractant; and (iv) recovering the neodymium or didymium values from said organic phase.

DETAILED DESCRIPTION OF THE PREFERRED EMBODIMENTS OF THE INVENTION

Figure 1:
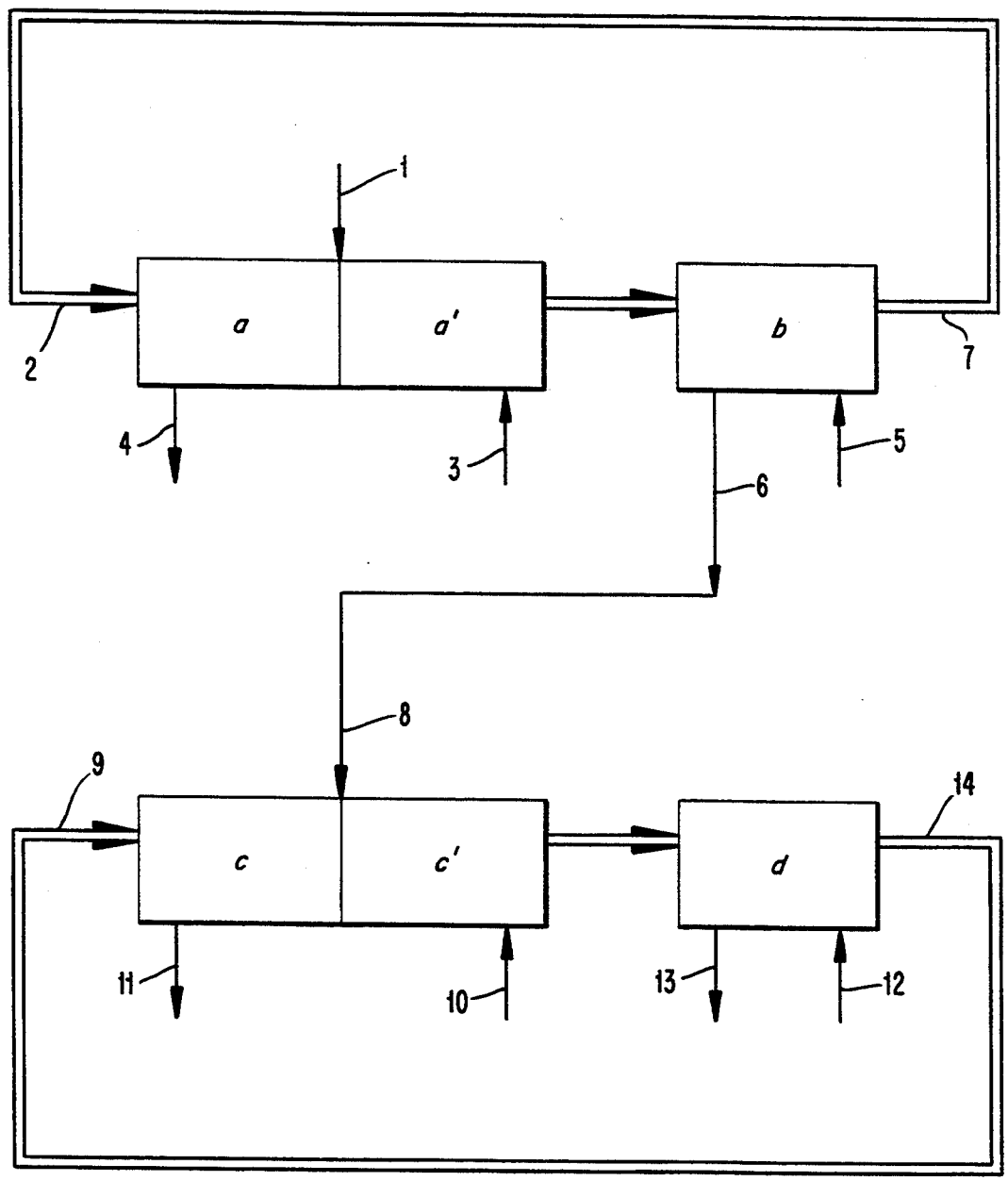
FIG. 1 is a flow diagram of the instant process.

More particularly according to the present invention, it has now unexpectedly been found that excellent cerium/other rare earths selectively is attained over the course of the selective leaching operation utilizing the nitric acid solution. Furthermore, it has also been determined that thorium exhibits a behavior similar to that of cerium during leaching, such that the process of the invention has the capability of simultaneously eliminating both the cerium values and the trace amounts of thorium present in bastnaesite.

However, small amounts of cerium and thorium may be solubilized in the nitric acid solution. In the process according to the invention, the solubilized cerium is essentially in the tetravalent state, enabling the easy separation thereof, together with the thorium, from the mixture of the trivalent nitrates of the rare earths, for example, by a pre-neutralization operation, during which the small amounts of cerium and thorium are eliminated in the form of a solid residue (which also contains the fluorine that was solubilized in small amounts during the nitric acid recovery stage).

The leaching of bastnaesite with a solution of nitric acid enables the selective solubilization of the trivalent rare earths to the exclusion of the cerium values, the soluble traces of which are principally in tetravalent form. Such a selective leaching step is known to the art and is described, using hydrochloric acid, in French Patent No. 1,503,042, but in that case the cerium is solubilized in the trivalent state and, therefore, cannot be readily separated from the other trivalent rare earths.

Furthermore, operating with a nitric acid medium broadens the possible choice of the extraction solvent, which is then used for the separation of the rare earths from each other. It is possible in this such case to use anionic, cationic and solvating extraction agents, which is not the case respecting a hydrochloric acid medium. With hydrochloric acid, the rare earths may usually be separated only with cationic extraction agents.

According to the invention, the source or raw material for the rare earths is bastnaesite, which is essentially a rare earth fluocarbonate.

The rare earths present are essentially the ceric rare earths of lanthanum, cerium, praseodymium and neodymium and the other rare earths, designated yttric rare earths, may represent up to approximately 8%, most typically less than 2%, expressed by weight relative to the total weight of the oxides. Thorium may also be present in an amount representing at most 1.5% of the total weight of the oxides and more often only trace amounts thereof, corresponding at most to 0.5% by weight.

In a preferred embodiment of the invention, a bastnaesite mineral is used containing more than 10% by weight of the rare earths, expressed as the rare earth oxides.

It is, however, more advantageous to use bastnaesite mineral concentrates obtained in conventional enrichment manner employing physical methods, grinding and flotation, or concentration by gravity on shaking tables and/or enrichment by a chemical method, for example, an acid treatment, in particular with a dilute solution of hydrochloric or nitric acid having an approximate concentration of 10%, in order to eliminate the calcite.

The bastnaesite concentrates typically have a rare earth content, expressed as the oxides thereof, of from 40 to 75% by weight.

The first stage of the process of the invention entails calcining the bastnaesite at a temperature sufficiently high to transform the trivalent rare earths into a form capable of being solubilized in the subsequent nitric acid leaching step and converting the cerium into a form less soluble than the transformed trivalent rare earths.

The calcination is advantageously carried out at a temperature in excess of 400° C. Beyond this, the temperature is not critical, but favorable operating conditions combining efficiency and duration of process include calcining at temperatures of from 600° to 800° C.

The duration of calcination depends upon the temperature of calcination: the higher the temperature, the shorter the duration. The calcining operation typically extends from 30 min to 3 hr.

Following the calcination, a controlled leaching of the calcined bastnaesite is carried out using an aqueous nitric acid solution, thus selectively solubilizing the trivalent rare earths.

The concentration of the nitric acid solution is not crucial. It may vary over a wide range, for example, from 1 to 14N, but it is preferable to use an aqueous nitric acid solution having a concentration of 3 to 9N.

The amount of the acid used is important. It is controlled as a function of the effectiveness of solubilization and the desired selectivity for the separation of cerium from the other rare earths. Excellent cerium/rare earth separation, together with very good recovery of the trivalent rare earths, in particular of neodymium, is obtained by using an amount of acid corresponding to the stoichiometry of the trivalent rare earths. This amount may also vary depending on the origin of the bastnaesite which may involve a variation in the distribution of the rare earth among themselves. However, most often the bastnaesites contain about as much cerium as the other rare earths. Therefore, in this case the amount of acid used corresponds to one-half of the stoichiometry of all of the rare earths, including the cerium in the initial material.

The amount of acid used is preferably that amount essentially corresponding to the stoichiometry of the trivalent rare earths, but it is possible to employ a stoichiometric excess of up to 50%.

The leaching is carried out at a temperature which is not critical, typically ranging from 20° to 90° C.

The retention time in the leaching solution depends to some extent on the mineral and the conditions of calcination. It typically ranges from 30 min to 2 hr.

Good conditions of separation are provided using a treatment at 60° C. for a retention time of one hour.

Upon completion of this operation, the aqueous solution of rare earth nitrates is separated from the solid residue by conventional liquid/solid separation technique, for example, by filtration or centrifugation, The solid residue containing essentially all of the cerium, principally in the form of the oxides thereof, together with possible trace amounts of thorium, is recovered. This residue may be used as is, as a cerium concentrate.

With specific respect to the leaching solution recovered, in general, if the process is carried out under the aforenoted preferred conditions, less than 10% of the cerium and more than 90% of the trivalent rare earths, including the neodymium initially included in the bastnaesite, are solubilized.

The concentration of rare earths in the resulting solution depends on the nitric acid concentration used for the leaching. Under the preferred conditions, this concentration, expressed as the oxides of the rare earths, advantageously ranges from 150 to 500 g/l.

Over the course of a continuous separation, it may be advantageous to eliminate the trace amounts of the tetravalent cerium and thorium present in the aqueous solution of rare earth nitrates.

For this purpose, a pre-neutralization process is first carried out by means of a base, which preferably is ammonia or sodium hydroxide.

The amount of base added, which may be introduced in the solid form, in the gaseous state in the case of ammonia, or as an aqueous solution, is determined such that the pH of the aqueous solution of rare earth nitrates ranges from 2 to 4.

Under such pH conditions, a precipitation of the tetravalent cerium, thorium and the fluorine solubilized during the nitric acid recovery takes place.

The precipitate is separated in conventional manner and an aqueous solution of rare earth nitrates is obtained, from which the neodymium or didymium is separated.

The separation of the neodymium or didymium from the other trivalent rare earth is carried out by liquid/liquid extraction, by intimately contacting an aqueous phase containing the rare earth nitrates with an organic phase containing an extractant that is insoluble in water, followed by the back-extraction of neodymium or didymium from the organic phase.

The extractant used in the process of the invention may be selected from among those extraction agents displaying a selectivity in respect of the rare earths.

The extractant may be selected from the class of anionic extraction agents, the class of solvating agents, or from the class of cationic extraction agents.

The anionic extractants are notably long hydrocarbon chain organic compounds comprising amine functions.

The hydrocarbon chains of these compounds typically and preferably contain from about 5 to 30 carbon atoms.

Exemplary thereof, the following are representative:

(a) tertiary amines, and specifically the products marketed under the trademarks Alamine 336 and Adogen 364, which include tertiary amines of the formula $R_3N$, wherein the hydrocarbon radical R has from 8 to 10 carbon atoms; and (b) quaternary ammonium nitrates, and in particular quaternaries derived from the products marketed under the trademarks Adogen 464 and Aliquat 336, which are quaternary ammonium salts of the following formula:

$$[R_3N-CH_3]^+Cl^-$$

wherein the hydrocarbon radical R has 8 to 10 carbon atoms.

The cationic extractants are preferably organic phosphorus acids, aliphatic or aromatic carboxylic acids, whether or not halogenated, naphthenic acids, and β-diketones.

Exemplary of such extractants, the following are representative:

(a) organic phosphorus acid derivatives of the general formulae:

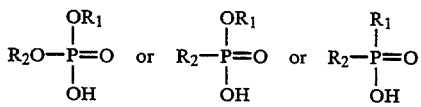

wherein $R_1$ and $R_2$ are aliphatic or aromatic hydrocarbon radicals, such that the total number of carbon atoms therein is at least equal to 10. Preferably, di(2-ethylhexyl)phosphoric acid and bis(2-ethylhexyl)phosphonic acid are used;

(b) carboxylic acids marketed by Shell Chemical Co. under the trademark "VERSATIC" and having the following general formula:

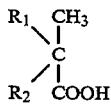

wherein $R_1$ and $R_2$ are substituted or unsubstituted hydrocarbon radicals, in particular the acid "VERSATIC 10" (registered trademark) prepared by the carboxylation of $C_9$ olefins and in which $R_1$ and $R_2$ are hydrocarbon radicals, with the sum of the carbon atoms in the two radicals being equal to 7.

The preferred solvating extractants are the sulfoxides and neutral organic phosphorus compounds.

Exemplary thereof the following are representative:
(a) sulfoxides of the general formula:

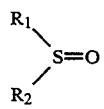

wherein $R_1$ and $R_2$ are aromatic and/or aliphatic hydrocarbon radicals, preferably having at least 4 carbon atoms, for example, di-n-heptylsulfoxide, di-n-octylsulfoxide:

(b) neutral organic phosphorus compounds of the general formulae:

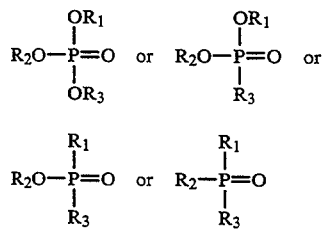

wherein $R_1$, $R_2$ and $R_3$ are aromatic or cycloaliphatic and/or aliphatic hydrocarbon radicals, preferably having at least 4 carbon atoms.

Representative species thereof include, for example: tributylphosphate, dibutylbutyl-phosphonate, bis(2-ethylhexyl)-2-ethylhexyl phosphonate, tri-n-octylphosphine oxide.

Among such compounds, tributylphosphate is the preferred.

The organic phase according to the invention optionally contains, in addition to the extraction agent, an organic diluent. As suitable diluents, those customarily used for liquid/liquid extractions are representative. Among such diluents, the following are exemplary: dodecane and the petroleum fractions of kerosene type; aromatic hydrocarbons, such as, for example, petroleum fractions consisting of mixtures of alkylbenzenes, in particular fractions of Solvesso type, marketed by Exxon.

A mixture of such diluents may also be used.

The amount of the extractant in the organic phase is not critical and may vary over wide limits. However, it is generally advantageous that it be as high as possible. Thus, in the case of anionic or cationic extractants, an amount of from 10 to 40% by volume relative to the organic phase provides advantageous hydrodynamic separation conditions. In the case of the solvating extractants, certain of these (those with the lower viscosities) may be used in the pure state, i.e., without dilution, which is extremely advantageous, as it provides very high extraction rates.

The organic phase according to the invention may also contain various modifying agents, one of the essential objectives of which is to improve the hydrodynamic properties of the system without altering the complexing properties of the extraction agent. Exemplary of such compounds, the following are particularly representative: compounds with alcohol functions and especially heavy alcohols having from 4 to 15 carbon atoms. A proportion of up to 20% by volume relative to the organic phase typically provides good results.

The separation of the trivalent rare earths from each other is carried out countercurrently employing several theoretical extraction stages, each stage including a mixing-decantation operation.

The aqueous solution of the rare earth nitrates to be separated is countercurrently introduced into an intermediate stage of the system, thereby establishing two zones of "extraction" and "selective washing" separation, on either side of such feed inlet. At each end of the extraction apparatus, means for partial reflux of the solutions containing the separated elements are provided, adapted to the properties of the particular extractant used; acid or base for a cationic extraction agent, water or vapor to dilute or concentrate in the case of solvating or anionic extraction agents. The efficiency of the separation depends on the number of stages and the separation factor.

For calculation of the separation factor, reference is made to the literature, in particular the articles by J. Helgorsky and A. Leveque, *Ullmanns Encyclopedia*, 21, pp. 235 to 271 (1982) and by Brown et al., *J. Chem. Tech. Biotechnol.*, 29, pp. 193–209 (1979).

After the extraction and washing operations, followed by a separation of the aqueous phase and the organic phase, a back-extraction of the rare earths contained in the extraction solvent is carried out.

The rare earth or earths extracted into the organic phase are separated by contacting the latter with water or a slightly acid solution, less than approximately 1N, preferably a nitric acid solution in the case of anionic or solvating extractants, or a more concentrated solution of nitric acid, in the case of cationic extractants.

The rare earth or earths extracted are recovered in the aqueous phase, while the extraction solvent may be recycled back to the extraction stage.

According to the invention, the separation of the neodymium or didymium values may be carried out in any one of a number of different modes of operation. The order of the separations is not important.

To separate the neodymium in one embodiment of the invention, the separation of lanthanum/praseodymium from the neodymium/yttric rare earth mixture is carried out, followed by the separation of the neodymium from the yttric rare earths, or, in a second embodiment, the ceric rare earths (La, Nd, Pr) are separated from the yttric rare earths, followed by the separation of lanthanum and praseodymium from the neodymium.

More particularly according to such first embodiment, the aqueous solution of rare earth nitrates is contacted with the extraction solvent in a manner such that the neodymium and yttric rare earth nitrates are extracted into the organic phase, with the lanthanum and praseodymium nitrates remaining in the aqueous phase. The nitrates of neodymium and the yttric rare earths are then extracted from the organic phase into an aqueous phase, and this in turn is contacted with an extraction solvent such that the nitrates of the yttric rare earths are extracted into an organic phase, while the neodymium nitrate remains in the aqueous phase. In the second embodiment of separation, the aqueous solution of the rare earth nitrates is contacted with the extraction solvent in a manner such that the nitrates of the yttric rare earths are extracted into the organic phase and the nitrates of lanthanum, neodymium and praseodymium remain in the aqueous phase. Said aqueous phase is then contacted with an extraction solvent to extract the neodymium nitrate into the organic phase, the nitrates of lanthanum and praseodymium remaining in the aqueous phase, and the neodymium nitrate is next back-extracted from the organic phase and recovered from the aqueous phase.

To recover the didymium, in one embodiment of the invention the separation of lanthanum from the didymium/yttric rare earth mixture is first carried out, followed by separation of the didymium from the yttric rare earths. In a second such embodiment, the ceric rare earths (La, Nd, Pt) are separated from the yttric rare earths, followed by the separation of lanthanum from didymium.

The solutions of neodymium or didymium produced according to this invention constitute preferred starting materials for the preparation of carbonates, chlorides, fluorides or oxides, all useful intermediates in the production of magnetic materials.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

This example illustrates the selectivity in the solubilization of cerium trivalent rare earths during the controlled leaching of calcined bastnaesite concentrate according to the invention.

The starting material bastnaesite mineral (1) had the following composition by weight:

| | | |
|---|---|---|
| (i) | Heating loss: | 17.4% |
| (ii) | CaO: | 0.25% |
| (iii) | $P_2O_5$: | 1.9% |
| (iv) | BaO: | 1.75% |
| (v) | $F^-$: | 5.0% |
| (vi) | $Fe_2O_3$: | 0.3% |
| (vii) | $SiO_2$: | 0.1% |
| (viii) | $Al_2O_3$: | 0.05% |
| (ix) | Total amount of rare earth oxides: 74.5%, in the following distribution: | |
| | $CeO_2$: | 51.0% |
| | $La_2O_3$: | 32.0% |
| | $Pr_6O_1$[1]: | 4.2% |
| | $Nd_2O_3$: | 11.8% |
| | $Sm_2O_3$: | 0.8% |
| | $Eu_2O_3$: | 0.1% |
| | $Gd_2O_3$: | 0.2% |
| | $Y_2O_3$: | 0.2% |
| | $ThO_2$: | 0.3% |

The calcination of 1 kg of the bastnaesite concentrate was carried out in a muffler furnace for 3 hr at 700° C.

831 g of the calcined bastnaesite concentrate (2) were obtained, having the following composition:

| | | |
|---|---|---|
| (i) | Heating loss: | 0.6% |
| (ii) | CaO: | 0.3% |
| (iii) | $P_2O_5$: | 2.3% |
| (iv) | BaO: | 2.1% |
| (v) | $F^-$: | 5.9% |
| (vi) | Total rare earth oxides: | 89.6% |

Subsequently, controlled leaching of 100 g of the calcined bastnaesite (2) was carried out by treating it with 120 cm³ of 6.5N nitric acid.

This treatment was conducted under agitation of 60° C. with a retention time of 1 hr.

The solid residue in the rare earth nitrate solution was separated by Buchner filtration.

The solution recovered contained rare earths in a concentration, expressed as the oxides thereof, of 370 g/l, with 4.8 g/l fluorine and 0.35 g/l Fe$_2$O$_3$. The distribution of the rare earths was as follows:

|  |  |
|---|---|
| CeO$_2$: | 6.0% |
| La$_2$O$_3$: | 60.3% |
| Pr$_6$O$_{11}$: | 8.3% |
| Nd$_2$O$_3$: | 22.6% |
| Sm$_2$O$_3$: | 1.6% |
| Other rare earths: | 1.2% |

These results correspond to the degree of solubilization of the rare earths contained in the initial bastnaesite concentrate:

|  |  |
|---|---|
| CeO$_2$: | 5.6% |
| La$_2$O$_3$: | 90.6% |
| Pr$_6$O$_{11}$: | 95.3% |
| Nd$_2$O$_3$: | 92.1% |
| Sm$_2$O$_3$: | 93.1% |

It will be noted that the yield of solubilization of the trivalent rare earths was 95.3% and that of cerium 5.6%.

It was also found that the soluble cerium consisted of 71.1% cerium (IV). The fluorine was solubilized to the extent of 9.8% only.

EXAMPLE 2

A series of experiments was carried out according to the procedure of Example 1, in order to determine the effect of the amount of nitric acid on cerium/rare earth selectivity.

For this purpose, 4 fractions of 100 g of the calcined bastnaesite concentrate (2) of Example 1 were taken.

The fractions were decomposed under the conditions of Example 1, using different amounts of 6.5N nitric acid as indicated in Table I. After separating the residues and analyses thereof, the following solubilization proportions were obtained:

TABLE I

| 6.5 N HNO$_3$ | 120 cm$^3$ | 180 cm$^3$ | 240 cm$^3$ | 360 cm$^3$ |
|---|---|---|---|---|
| Total concentration of the rare earth nitrate solution in rare earth oxides (g/l) | 370 | 310 | 340 | 240 |
| Solubilization proportion (%) |  |  |  |  |
| Lanthanum | 90.6 | 92.0 | 98.4 | 96.6 |
| Cerium | 5.6 | 31.5 | 85.9 | 95.9 |
| Praseodymium | 95.3 | 96.0 | 98.7 | 96.6 |
| Neodymium | 92.1 | 90.7 | 90.9 | 96.7 |
| Trivalent rare earths | 95.3 | 95 | 96.2 | 97 |
| Thorium | <1 | 15 | 62.5 | 97.5 |
| Fluorine | 9.8 |  | 80 |  |
| Ce$^{IV}$/Ce Total | 0.71 | 0.82 | 0.94 | 0.98 |

From these results, an adequate amount of the acid is determined to correspond to the stoichiometry of the trivalent rare earths.

EXAMPLE 3

This example illustrates, relative to Example 2, the effect of the nitric acid concentration.

The procedure was as in Example 2, with the difference that the leaching of the calcined bastnaesite concentrate (2) was carried out using a 3.5 N aqueous solution of nitric acid.

The results obtained are reported in Table II.

TABLE II

| 3.5 N HNO$_3$ | 220 cm$^3$ | 340 cm$^3$ | 450 cm$^3$ | 670 cm$^3$ |
|---|---|---|---|---|
| Total concentration of the rare earth nitrate solution, expressed in rare earth oxides (g/l) | 150 | 145 | 135 | 95 |
| Solubility portion (%) |  |  |  |  |
| Lanthanum | 75.8 | 94.9 | 95.1 | 96 |
| Cerium | 0.1 | 16.7 | 41.1 | 45 |
| Praseodymium | 83.9 | 95.3 | 95.3 | 95.5 |
| Neodymium | 83.5 | 93 | 93.7 | 95.2 |
| Samarium | 82.1 | 93.1 | 93.1 | 97 |
| Trivalent rare earths | 75.5 | 93.3 | 95.4 | 96 |
| Thorium | <1 | 12 | 50 | 63 |

A comparison of Examples 1 and 2 demonstrates that the concentration of the aqueous nitric acid solution is not critical.

EXAMPLE 4

This example illustrates the separation of neodymium.

The bastnaesite concentrate of Example 1 was calcined and subjected to controlled leaching under the conditions described in Example 1.

Upon completion of this treatment, the solid residue containing essentially the cerium was separated by filtration from the aqueous solution of rare earth nitrates having a concentration, expressed in terms of the oxides thereof, equal to 370 g/l.

The tetravalent cerium and the trace amounts of thorium present in said solution were eliminated by the addition of a 10N aqueous solution of ammonia, until a pH of 3.5 was attained.

A solid residue containing all of the tetravalent cerium and the thorium was separated by filtration. Analysis of the residue showed that it also contained 86% of the fluorine, essentially all solubilized iron, and 5% of the trivalent rare earths.

The rare earth nitrate solution that was recovered had a concentration, expressed as the rare earth oxides, equal to 337 g/l and contained 0.7 g/l fluorine, less than 10 mg/l Fe$_2$O$_3$ and less than 10 mg/l ThO$_2$. Its rare earth distribution was as follows:

63.0% La$_2$O$_3$
1.8% CeO$_2$
8.7% Pr$_6$O$_{11}$
23.6% Nd$_2$O$_3$
1.7% Sm$_2$O$_3$
1.3% other rare earths.

This solution was concentrated by evaporation until a concentration, expressed as the rare earth oxides, of 490 g/l was produced.

The concentrated solution was then subjected to successive liquid/liquid extractions according to the process/apparatus illustrated in the Figure of Drawing.

The apparatus used for the separation of the rare earths comprised:

(I) a first liquid/liquid extraction battery having several mixer/settler stages, operating countercurrently and consisting of an extraction section (a) and a washing section (a') including 40 theoretical stages and a back-extraction section (b) for the rare earths extracted into the organic phase, including 10 theoretical stages; and (ii) a second liquid/liquid extraction battery consisting of an extraction section (c) and a washing section (c'), including 40 theoretical stages, and a back-extraction section (d) for the rare earths extracted into the organic phase, including 10 theoretical stages.

The extractant was tributylphosphate. It was dissolved in kerosene in a proportion of 75% by volume, and the mixture obtained shall be designated the extraction solvent.

Prior to a detailed description of the different operations, it is mentioned that, as the inlet and outlet of the extraction/wash and back-extraction units, the direction of circulation of the organic phase was selected.

The aqueous solution of the rare earth nitrates was introduced at line 1 into the 20th stage of the extraction/wash unit, at a flow rate of 2.05 liter/hr.

At the inlet of the extraction/wash unit, via line 2, the organic phase consisting of the extraction solvent was introduced at a rate of 8.8 liter/hr.

Via conduit 5, at the outlet of the back-extraction section and countercurrently with respect to the organic phase, acidified water ($HNO_3$- 0.1N) was introduced at a flow rate of 4.4 liter/hr.

At the inlet of the back-extraction section, line 6, an aqueous solution of rare earth nitrates containing the neodymium and the yttric rare earths was collected; it was concentrated by evaporation until a concentration, expressed as the rare earth oxides, of 490 g/l was obtained. From this, 0.54 liter/hr. was recovered, constituting the production of the neodymium concentrate and the remainder, 1.78 liter/hr, supplied the extraction/wash section, via line 3, and was refluxed. The neodymium concentrate had the following composition, expressed as the rare earth oxides:

88.4% $Nd_2O_3$
0.5% $Pr_6O_{11}$
6.3% $Sm_2O_3$
4.9% other rare earths.

At the inlet of the extraction/wash section, via line 4, an aqueous solution of rare earth nitrates was collected; it was then concentrated by evaporation until a concentration, expressed as the rare earth oxides, of 490 g/l was obtained. 1.5 Liter/hr was recovered; this represents the production of lanthanum concentrate and the remainder was recycled via line into the first stage of the battery. This lanthanum concentrate had the following composition, expressed as the rare earth oxides:

85.9% $La_2O_3$
2.4% $CaO_2$
11.7% $Pr_6O_{11}$
At least 0.01% of $Nd_2O_3$ and other rare earths.

Via line 7, at the outlet of the back-extraction section, the regenerated extraction solvent was recovered; it may be recycled via line 2 into the extraction/wash section at the same flow rate.

The neodymium concentrate described above constituted the feed for the second liquid/liquid extraction battery. It was introduced via line 8 into the 20th stage of the extraction/wash section.

At the inlet of the extraction/wash section, via line 9, the organic phase consisting of the same extraction solvent was introduced at a flow rate of 3.15 liter/hr.

At inlet 12, the acidified water was countercurrently introduced into the organic phase, at a flow rate of 1.6% liter/hr.

At outlet 13, a solution of rare earth nitrates was collected and concentrated by evaporation until a concentration, expressed as the rare earth oxides, of 490 g/l was obtained. Of this, 0.06 liter/hr was recovered, which constituted the production of a concentrate of yttric rare earth and 0.78 liter/hr was recycled via line 10 and refluxed. This concentrate of yttric rare earths had a concentration, expressed as the rare earth oxides, as follows:

56.2% $Sm_2O_3$
43.7% of other rare earths
0.12% $Nd_2O_3$

At the inlet 11 of the extraction/wash section, an aqueous solution of neodymium nitrate was collected and concentrated by evaporation until a concentration expressed as the rare earth oxides, of 490 g/l, was obtained. 0.48 l/hr was recovered, which constituted the production of neodymium, and the remainder was recycled via line 9, together with the organic phase.

The purity of the neodymium thus produced was the following:

99.4% $Nd_2O_3$
0.6% $Pr_6O_{11}$
At least 0.1% of other rare earths. At the outlet 14 of the back-extraction section, the regenerated extraction solvent was recovered; it may be recycled via line 9 into the extraction/wash section.

EXAMPLE 5

This example illustrate the separation of didymium.

According to the procedure described in Examples 1 and 4, the following operations were carried out:

(1) Calcination of the bastnaesite concentrate described in Example 1;
(2) Controlled leaching of the calcined bastnaesite concentrate;
(3) Separation of a solid residue, by filtration, of the rare earth nitrate solution;
(4) Pre-neutralization of said solution;
(5) Separation of a solid residue, by filtration, from the rare earth nitrate solution; and
(6) Concentration of this solution by evaporation, until a concentration, expressed as the rare earth oxides, of 490 g/l was obtained.

This concentrated solution was then subjected to the successive liquid/liquid extraction operations carried out according to the process/apparatus illustrated in the Figure of Drawing.

The apparatus used for the separation of the rare earths included:

(I) a first liquid/liquid extraction battery consisting of an extraction section (a) and a wash section (a'), including 48 theoretical stages, and a back-extraction section (b) for the rare earths extracted into the organic phase, including 10 theoretical stages, (II) a second liquid/liquid extraction battery consisting of an extraction section (c) and a wash section (c'), including 48 theoretical stages, and a back-extraction section (d) for the rare earths extracted into the organic phase, including 10 theoretical stages.

The extractant was tributylphosphate in solution in kerosene, in a proportion of 75% by volume.

The interrelationship among the stages was as follows:

The aqueous solution of the rare earth nitrates was introduced via line 1 into the 20th stage of the extraction/wash section, at a rate of 2.06 liter/hr.

At the inlet 2 of the extraction/wash section, the organic phase consisting of the extraction solvent was introduced, at a rate of 11.1 liter/hr.

At the outlet 5 of the back-extraction section, countercurrently to the organic phase, acidified water (HNO$_3$ - 0.1N) was introduced at a rate of 5.6 liter/hr.

At the inlet 6 of the back-extraction section, an aqueous solution of rare earth nitrates containing didymium and yttric rare earths was collected and then concentrated by evaporation, until a concentration, expressed as the rare earth oxides, of 490 g/l was obtained. From this, 0.72 liter/hr were recovered, which constituted the production of the didymium concentrate, and the remainder, 0.89 liter/hr, was introduced into the extraction/wash section via line 3 and was refluxed.

The didymium concentrate had the following composition, expressed as the rare earth oxides:
- 24.6% praseodymium
- 66.8% neodymium
- At least 0.01% cerium
- 8.5% other rare earths.

At the inlet 4 of the extraction/wash section, an aqueous solution of rare earth nitrates was collected, which was concentrated by evaporation until a concentration, expressed as the rare earth oxides, of 490 l/g was obtained. From this, 1.32 l/hr was recovered, to constitute the production of a lanthanum concentrate, and the remainder was recycled via line 2 into the first stage of the battery.

This lanthanum concentrate had the following concentration, expressed as the rare earth oxides:
- 97.2% La$_2$O$_3$
- 2.7% CeO$_2$
- At least 0.1% of Pr$_6$O$_{11}$ and other rare earths.

At the outlet 7 of the back-extraction section, the regenerated extraction solvent was recovered; it may be recycled via line 2 into the extraction/wash section, at the same flow rate.

The didymium concentrate described above constituted the feed for the second liquid/liquid extraction battery. It was introduced via line 8 into the 22nd stage of the extraction/wash section.

At the inlet 9 of the extraction/wash section, the organic phase consisting of the extraction solvent itself, was introduced at a rate of 3.1 liter/hr.

Via line 12, countercurrently with respect to the organic phase, acidified water was introduced, at a rate of 1.55 liter/hr.

A solution of rare earth nitrates was collected via line 13 and was concentrated by evaporation until a concentration, expressed as the rare earth oxides, of 490 g/l was obtained. From this, 0.06 liter/hr was recovered, which constituted the production of a concentrate of yttric rare earth oxides, and 0.78 liter/hr was recycled via line 10 and refluxed.

This yttric rare earth concentrate had the following composition, expressed as the rare earth oxides:
- 56.2% Sm$_2$O$_3$
- 43.6% other rare earths
- 0.19% Nd$_2$O$_3$.

At the inlet 11 of the extraction/wash section, an aqueous solution of neodymium and praseodymium nitrates was collected, which was concentrated by evaporation until a concentration, expressed as the rare earth oxides, of 490 g/l was obtained. From this, 0.66 l/hr was recovered, constituting the production of didymium, and the remainder was recycled via line 9 with the organic phase.

The didymium produced had the following composition:
- 26.9% Pr$_6$O$_{11}$
- 73.1% Nd$_2$O$_3$
- At least 0.01% of other rare earths.

At the outlet 14 of the back-extraction section, the regenerated extraction solvent was recovered, which may be recycled via line 9 into the extraction/wash section.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the recovery of neodymium or didymium values, comprising (i) calcining a bastnaesite ore, (ii) selectively leaching said calcined bastnaesite with an aqueous solution of nitric acid to solubilize therein trivalent rare earth values, wherein the amount of nitric acid used in said leaching is about the stoichiometric equivalent of the amount of trivalent rare earth elements present in said calcined ore, thereby producing a less soluble residue which comprises cerium and thorium values, (iii) separating said insoluble residue, and (iv) liquid/liquid extracting desired neodymium or didymium values from said nitric acid solution.

2. The process as defined by claim 1, said bastnaesite ore comprising at least 10% by weight of rare earth values, expressed as the oxides thereof.

3. The process as defined by claim 1, said bastnaesite ore being concentrated and comprising from 40 to 75% by weight of rare earth values, expressed as the oxides thereof.

4. The process as defined by claim 1, said calcination (i) being at a temperature greater than 400° C.

5. The process as defined by claim 4, said temperature of calcination ranging from about 600° to 800° C.

6. The process as defined by claim 5, said calcination being carried out for a period of time of from about 30 min to 3 hours.

7. The process as defined by claim 1, said nitric acid solution having a concentration of from 1N to 14N.

8. The process as defined by claim 1, said nitric acid solution having a concentration of from 3N to 9N.

9. The process as defined by claim 1, wherein the temperature of said selective leaching (ii) ranges from about 20° to 90° C.

10. The process as defined by claim 9, said selective leaching being carried out for a period of time of from about 30 min to 2 hours.

11. The process as defined by claim 1, further comprising pre-neutralizing said nitric acid solution to precipitate solubilized cerium and thorium values therefrom and then separating such precipitate, prior to said liquid/liquid extraction (iv).

12. The process as defined by claim 1, said nitric acid solution comprising from 150 to 500 g/l of rare earth values, expressed as the oxides thereof.

13. The process as defined by claim 1, said selective leaching (ii) solubilizing less than 10% of the cerium values and more than 90% of the trivalent rare earth values contained in said bastnaesite ore.

14. The process as defined by claim 11, comprising pre-neutralizing with ammonia.

15. The process as defined by claim 11, comprising pre-neutralizing with an alkali metal hydroxide.

16. The process as defined by claim 1, wherein said liquid/liquid extraction (iv) is carried out utilizing a solvating organic extractant.

17. The process as defined by claim 1, wherein said liquid/liquid extraction (iv) is carried out utilizing an anionic organic extractant.

18. The process as defined by claim 1, wherein said liquid/liquid extraction (iv) is carried out utilizing a cationic organic extractant.

19. The process as defined by claim 16, said solvating organic extractant comprising tributylphosphate.

* * * * *